(12) United States Patent
Mao et al.

(10) Patent No.: US 10,904,779 B2
(45) Date of Patent: Jan. 26, 2021

(54) ANTENNA STRUCTURE, ANTENNA DEVICE AND WIRELESS LOCALIZATION METHOD

(71) Applicant: iWave Technologies Co., Ltd., Kaohsiung (TW)

(72) Inventors: Shau-Gang Mao, Kaohsiung (TW); Chong-Yi Liou, Kaohsiung (TW); Yu-Yao Chen, Kaohsiung (TW); Wei-Ting Tsai, Kaohsiung (TW); Shih-Ping Huang, Kaohsiung (TW); Ming-Chih Kuan, Kaohsiung (TW); Chien-Bang Chen, Kaohsiung (TW); Zheng-An Peng, Kaohsiung (TW)

(73) Assignee: iWAVE TECHNOLOGIES CO., LTD., Kaohsiung (TW)

( * ) Notice: Subject to any disclaimer, the term of this patent is extended or adjusted under 35 U.S.C. 154(b) by 0 days.

(21) Appl. No.: 16/683,606

(22) Filed: Nov. 14, 2019

(65) Prior Publication Data
US 2020/0162947 A1    May 21, 2020

(30) Foreign Application Priority Data
Nov. 20, 2018   (TW) .............................. 107141321 A

(51) Int. Cl.
| H04W 24/00 | (2009.01) |
| H04W 24/06 | (2009.01) |
| H01Q 15/24 | (2006.01) |
| H04W 4/02  | (2018.01) |

(52) U.S. Cl.
CPC .......... *H04W 24/06* (2013.01); *H01Q 15/244* (2013.01); *H04W 4/023* (2013.01)

(58) Field of Classification Search
CPC .... H04W 24/06; H04W 4/023; H01Q 15/244; H01Q 9/42; G01S 5/10
USPC ............................ 455/456.1–456.3; 370/338
See application file for complete search history.

(56) References Cited

U.S. PATENT DOCUMENTS

| 2012/0052883 A1* | 3/2012 | Austin ................. G01S 5/0063 |
| | | 455/456.6 |
| 2019/0053013 A1* | 2/2019 | Markhovsky ......... H04W 4/025 |

\* cited by examiner

*Primary Examiner* — Marcos Batista
(74) *Attorney, Agent, or Firm* — Birch, Stewart, Kolasch & Birch, LLP

(57) ABSTRACT

The present invention provides an antenna structure, an antenna device and a wireless localization method. The antenna structure includes a first radiation unit including a plurality of first connecting portions and a plurality of first annular radiation portions, a second radiation unit including a plurality of second connecting portions and a plurality of second annular radiation portions, a first conductive wire and a plurality of second conductive wires. A first end of each first annular radiation portion is connected to the first connecting portion, and the second end thereof extends towards the first end of the adjacent first annular radiation portion. A first end of each second annular radiation portion is connected to the second connecting portion, and the second end thereof extends towards the first end of the adjacent second annular radiation portion.

6 Claims, 15 Drawing Sheets

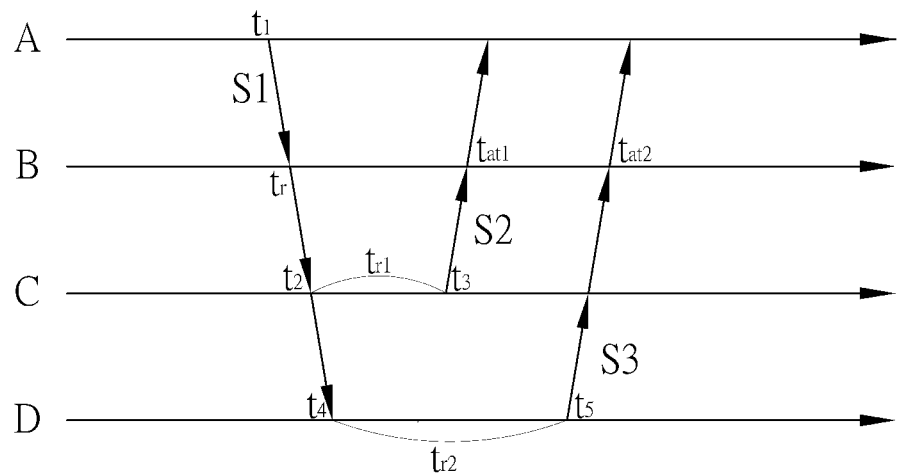

FIG. 20

```
                    ( START )
                         │
                         ▼                        ┌─ S200
┌─────────────────────────────────────────────────┐
│ the first base station deriving the first response time information, │
│  the first clock correcting coefficient, and the first transmission │
│     time information through a packet exchange process            │
└─────────────────────────────────────────────────┘
                         │
                         ▼                        ┌─ S100
┌─────────────────────────────────────────────────┐
│ The to-be-localized device receiving the first packet sent from the │
│        reference base station at the first time point             │
└─────────────────────────────────────────────────┘
```

FIG. 21

ANTENNA STRUCTURE, ANTENNA DEVICE AND WIRELESS LOCALIZATION METHOD

FIELD OF THE INVENTION

The present invention relates to an antenna structure, an antenna device and a wireless localization method, and specifically to an antenna structure and an antenna device method producing a circularly-polarized radiation pattern and a wireless localization method utilizing packet exchange.

BACKGROUND OF THE INVENTION

As wireless localization technology develops, the demand for accuracy in the localization has been increasing. Localization techniques in the prior art include primarily angle of arrival (AOA), time of arrival (TOA), time difference of arrival (TDOA). TOA and TDOA are localization techniques based on distance measurement, which are prevalent on the market due to their advantages in terms of equipment costs and testing costs. However, there are limitations in TOA and TDOA. To be specific, since the speed at which signals are transmitted between base stations are extremely fast, accurate time synchronization among base stations is highly demanded.

Symmetrical double-sided two-way ranging (SDS-TWR) is a ranging method proposed in the prior art, which dispenses with time synchronization among base stations and thus decreases the costs to realize wireless localization. However, conventional SDS-TWR requires packet transmission between the to-be-localized device and the base stations. Therefore, when applied to multiple devices to be localized, SDS-TWR requires longer time to localize the devices to be localized.

In addition, the polarization pattern of the antennas used in the localization system affects the localization accuracy. For instance, if linearly-polarized antennae are used in the devices to be localized and the base stations, the antennae cannot receive signals properly when the polarization direction of the antennae that emit signals is perpendicular to that of the antennae that receive signals, which decreases localization accuracy.

Therefore, wireless localization technology in the prior art remains to be improved.

SUMMARY OF THE INVENTION

Accordingly, an objective of the present invention is to provide an antenna structure and an antenna device having radiators that produce circularly polarized radiation pattern. Furthermore, another objective of the present invention is to provide a wireless localization method utilizing the antenna structure and the antenna device of the embodiment of the present invention, in which the devices to be localized only receive signals and do not send signals, thereby reducing time needed to realize wireless localization for a localization system containing plural devices to be localized.

One embodiment of the present invention provides an antenna structure including a first radiation unit, a second radiation unit, a first conductive wire and a plurality of second conductive wires. The first radiation unit includes a plurality of first connecting portions and a plurality of first annular radiation portions, the number of the first connecting portions corresponding to the number of the first annular radiation portion. Each first annular radiation portion has a first end connected to one of the first connecting portions, and a second end away from the first end extending towards the first end of the adjacent first annular radiation portion. An end of each first connecting portion away from the first annular radiation portion is connected to each other at a first geometric center of the plurality of first annular radiation portions. The second radiation unit includes a plurality of second connecting portions and a plurality of second annular radiation portions, the number of the second connecting portions corresponding to the number of the second annular radiation portions. Each second annular radiation portion has a first end connected to one of the second connecting portions, and a second end away from the first end extending towards the first end of the adjacent second annular radiation portion. An end of each second connecting portion away from the second annular radiation portion is connected to each other at a second geometric center of the plurality of second annular radiation portions. One end of the first conductive wire is connected to the plurality of first connecting portions at the first geometric center, another end of the first conductive wire being at the second geometric center of the plurality of second annular radiation portions. Each second conductive wire is connected between the second end of each first annular radiation portion and the second end of each second annular radiation portion. In each first annular radiation portion, the first end extends towards the second end in a direction opposite that in which the first end extends towards the second end in each second annular radiation portion with respect to the first conductive wire.

Another embodiment of the present invention provides an antenna device, including the above-mentioned antenna structure, a fourth radiation unit and a power splitting unit. The power splitting unit has a first pathway portion, a second pathway portion, and a feeding portion connecting the first pathway portion and the second pathway portion, an end of the first pathway portion away from the feeding portion being connected to the antenna structure, and an end of the second pathway portion away from the feeding portion being connected to the fourth radiation unit. The fourth radiation unit is used for producing a circularly-polarized radiation pattern parallel to the first conductive wire.

Another embodiment of the present invention provides a wireless localization method, including: a to-be-localized device receiving a first packet from a reference base station at a first time point; the to-be-localized device receiving a second packet from a first base station at a second time point, wherein the second packet includes a first response time information, a first clock correcting coefficient of the first base station with respect to the reference base station, and a first transmission time information, in which the first response time information corresponding to the time needed for the first base station to process information sent from the reference base station, and the first transmission time information corresponding to the transmission time between first base station and the reference base station; the to-be-localized device receiving a third packet from a second base station at a third time point, wherein the third packet includes a second response time information, a second clock correcting coefficient of the second base station with respect to the reference base station, and a second transmission time information, in which the second response time information corresponding to the time needed for the second base station to process information sent from the reference base station, and the second transmission time information corresponding to the transmission time between second base station and the reference base station; the to-be-localized device deriving a second-time-point calibrating value according to the second time point, the first response time information, the first clock correcting coefficient, the first transmission time information and a third clock correcting coefficient of the to-be-localized device with respect to the reference base station; the to-be-localized device deriving a third-time-point calibrating value according to the third time point, the second response time information, the second clock correcting coefficient, the second transmission time information and the third clock correcting coefficient; and deriving a localization information of the to-be-localized device according to the second-time-point calibrating value, the third-time-point calibrating value and the first time point through a time-difference-of-arrival localization process.

Another embodiment of the present invention provides a wireless localization method, applicable to a wireless localization system. The wireless localization system includes a to-be-localized device, a reference base station, a first base station and a second base station, wherein the to-be-localized device, the reference base station, the first base station and the second base station have an above-mentioned antenna structure. The method includes the to-be-localized device receiving a first packet from the reference base station at a first time point; the to-be-localized device receiving a second packet from the first base station at a second time point, wherein the second packet includes a first response time information, a first clock correcting coefficient of the first base station with respect to the reference base station, and a first transmission time information, in which the first response time information corresponding to the time needed for the first base station to process information sent from the reference base station, and the first transmission time information corresponding to the transmission time between first base station and the reference base station; the to-be-localized device receiving a third packet from the second base station at a third time point, wherein the third packet includes a second response time information, a second clock correcting coefficient of the second base station with respect to the reference base station, and a second transmission time information, in which the second response time information corresponding to the time needed for the second base station to process information sent from the reference base station, and the second transmission time information corresponding to the transmission time between second base station and the reference base station; the to-be-localized device deriving a second-time-point calibrating value according to the second time point, the first response time information, the first clock correcting coefficient, the first transmission time information and a third clock correcting coefficient of the to-be-localized device with respect to the reference base station; the to-be-localized device deriving a third-time-point calibrating value according to the third time point, the second response time information, the second clock correcting coefficient, the second transmission time information and the third clock correcting coefficient; and deriving a localization information of the to-be-localized device according to the second-time-point calibrating value, the third time-calibrating value and the first time point through a time-difference-of-arrival localization process.

To further learn the features and technical content of the present invention, please refer to the following detailed descriptions and drawings related to the present invention. However, the provided drawings are used only for providing reference and descriptions, and are not intended to limit the present invention.

BRIEF DESCRIPTION OF THE DRAWINGS

FIG. 20 shows the timelines according to the wireless localization method according to the fourth embodiment of the present invention.

FIG. 21 is a flow chart showing a varied embodiment of the wireless localization method according to the fourth embodiment of the present invention.

DETAILED DESCRIPTION OF THE PREFERRED EMBODIMENTS

Embodiments of the present invention are described below with reference to FIG. 1 to FIG. 22. A person skilled in the art can understand the advantages and effects of the present invention from the description disclosed below. However, the content disclosed below is not intended to limit the protection scope of the present invention. The present invention can be implemented by a person skilled in the art based on different perspectives and applications without departing from the concept and spirit of the present invention. In addition, it should be stated in advance that the accompanying drawings of the present invention are merely used for illustration and are not drawn according to actual dimensions. Moreover, although terms, such as first, second, and third, may be used to describe various components, the component should not be limited by the terms. Said terms are used to distinguish different components.

First Embodiment

Figure 1:
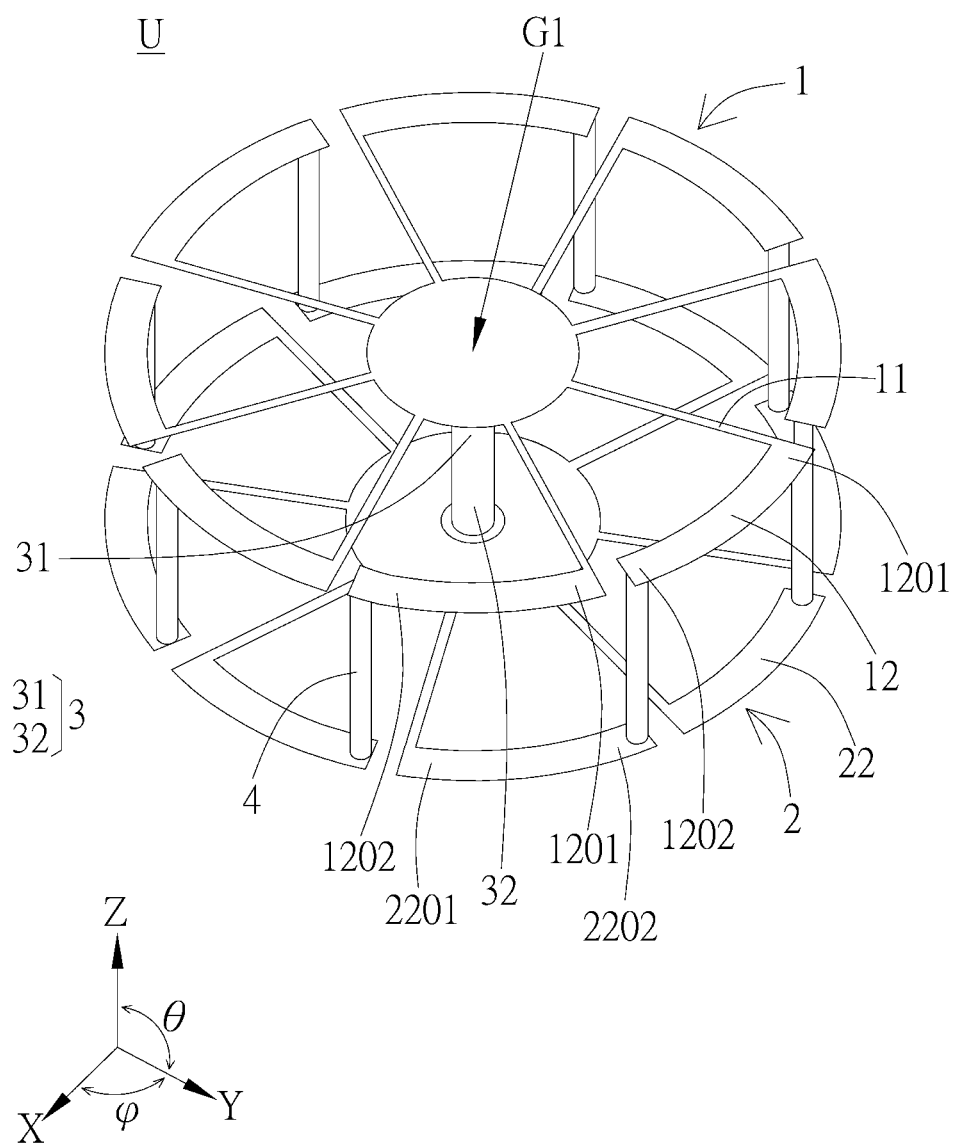
FIG. 1 is a schematic view showing an antenna structure according to a first embodiment of the present invention.

Pease refer to FIG. 1. The first embodiment of the present invention provides an antenna structure U having a first radiation unit 1, a second radiation unit 2, a first conductive wire 3, and a plurality of second conductive wires 4. The first radiation unit 1 has a plurality of first connecting portions 11 and a plurality of first annular radiation portions 12. The second radiation unit 2 has a plurality of second connecting portions 21 and a plurality of second annular radiation portions 22. The first end 31 of the first conductive wire 3 is connected to the first connecting portions 11 at the first geometric center G1, and the second end 32 of the first conductive wire 3 is located at the center of the second annular radiation portions 22. The plurality of second conductive wires 4 are connected between the first radiation unit 1 and the second radiation unit 2. The first annular radiation portions 12 are coplanar and parallel to the XY plane. In the present embodiment, the first conductive wire 3 and the second conductive wires 4 are parallel to the Z axis and perpendicular to the planes respectively defined by the first annular radiation portions 12 and the second annular radiation portions 22. However, the present invention is not limited thereto.

Figure 2:
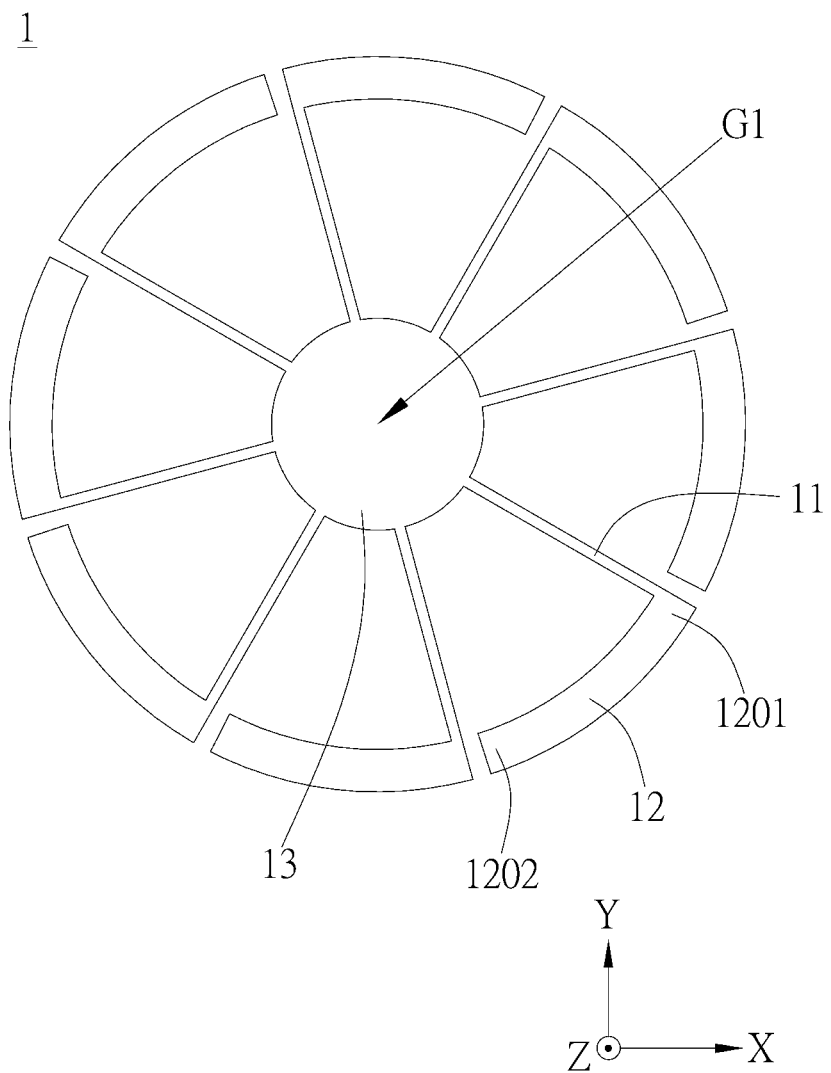
FIG. 2 is a top view showing the first radiation unit according to the first embodiment of the present invention.

Please refer to FIG. 1 and FIG. 2. Specifically, the number of the first connecting portions 11 corresponds to that of the first annular radiation portions 12. Each first annular radiation portion 12 includes a first end 1201 and a second end 1202 away from the first end 1201. The first end 1201 of each first annular radiation portion 12 is connected to an end of the first connecting portion 11 away from the first geometric center G1, and the first end 1201 of each first annular radiation portion 12 extends towards the adjacent first annular radiation portion 12.

In the present invention, the first radiation unit 1 further includes a first center portion 13, which is circle-shaped with a center situated at the first geometric center G1 of the first annular radiation portions 12, as shown in FIG. 1. One end of each first connecting portion 11 is connected to each other at the first center portion 13. In the present invention, the first center portion 13 serves to facilitate interconnection between the first conductive wire 3 and the first radiation unit 1. However, the present invention is not limited thereto. In another embodiment, the first center portion 13 can be non-circular; in other embodiments, the first radiation unit 1 can dispense with the first center portion 13, in which the first connecting portions 11 are interconnected at the first geometric center G1.

Figure 3:
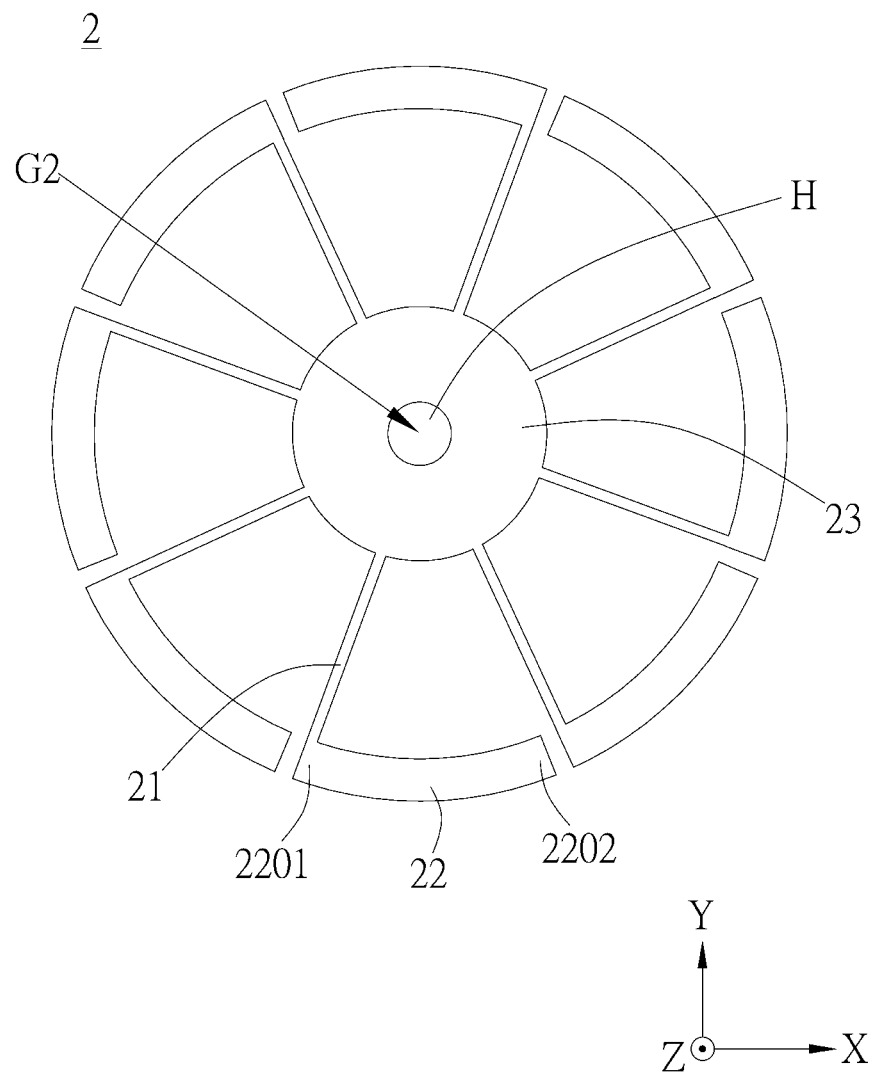
FIG. 3 is a top view showing the second radiation unit according to the first embodiment of the present invention.

With reference to FIG. 1 and FIG. 3, the second connecting portions 21 and the second annular radiation portions 22 of the second radiation unit 2 have similar structures with the first connecting portions 11 and the first annular radiation portions 12 of the first radiation unit 1. Specifically, each second annular radiation portion 22 has a first end 2201 and a second end 2202 away from the first end 2201. The first end 2201 of each of the second annular radiation portions 22 is connected to one end of the second connecting portion 21 away from the second geometric center G2, and the second end 2202 of each of the second annular radiation portions 22 extends towards the first end 2201 of the adjacent second annular radiation portion 22. Furthermore, the first end 1201 of each of the first annular radiation portions 12 extends towards the second end 1201 in a direction opposite that in which the first end 2201 extends towards the second end 2202 in each second annular radiation portion 22. Each of the second conductive wires 4 is connected between the second end 1202 of the first annular radiation portions 12 and the second end 2202 of the corresponding second annular radiation portion 22.

In the present embodiment, the second radiation unit 2 includes a second center portion 23, which is circle-shaped with the center being situated at the second geometric center G2, as shown in FIG. 3. The end of each second connecting portion 21 away from the second annular radiation portions 22 extends towards the second geometric center G2 and is connected to the second center portion 23. In the present embodiment, the second center portion 23 has a center hole H for the second end 32 of the first conductive wire 3 to pass through. The center hole H serves as an outlet of antenna signals; therefore, the diameter of the center hole H is preferably larger than that of the second end 32 of the first conductive wire 3. The present invention is not limited to the above. For example, in other examples, the second radiation unit 2 can include no second center portion 23, in which the end of each of the second connecting portions 21 away from the second annular radiation portions 22 is an outlet of antenna signals.

Referring back to FIG. 1, the first conductive wire 3 and the second conductive wires 4 contribute to the linearly-polarized electromagnetic field component ($E_0$) parallel to the Z-axis in the radiation pattern of the antenna structure U, and the first radiation unit 1 and the second radiation unit 2 provide the linearly-polarized electromagnetic field component ($E_{100}$) parallel to the XY plane in the radiation pattern of the antenna structure U. By providing two linearly-polarized components that are perpendicular with each other, and arranging the phase difference between the two components to be 90 degrees or 270 degrees, a circularly-polarized radiation pattern can be achieved. Furthermore, the feeding point of the antenna structure U is preferably the second end 32 of the first conductive wire 3. In this way, antenna signals will enter the first radiation unit 1 at the first end 31 of the first conductive wire 3, and transmitted to the first annular radiation portions 12 through the first connecting portions 11, and then from the second end 1202 of each of the first annular radiation portions 12 to the second end 2202 of each of the second annular radiation portions 22 through the second conductive wires 4. The antenna signals are eventually transmitted from the first end 2201 of the each of the second annular radiation portions 22 to the second connecting portions 21, and then output at the end of the second connecting portions 21 away from the second annular radiation portions 22.

Through the aforementioned technical solution, antenna signals are transmitted in the first annular radiation portions 12 in the same direction as in the second annular radiation portions 22. In other words, when seen from above (from +Z to −Z), antenna signals are transmitted clockwise in both the first annular radiation portions 12 and the second annular radiation portions 22, or counterclockwise in both the first annular radiation portions 12 and the second annular radiation portions 22. In this way, the present invention reduces signal interference between the first annular radiation portions 12 and the second annular radiation portions 22.

Figure 4A:
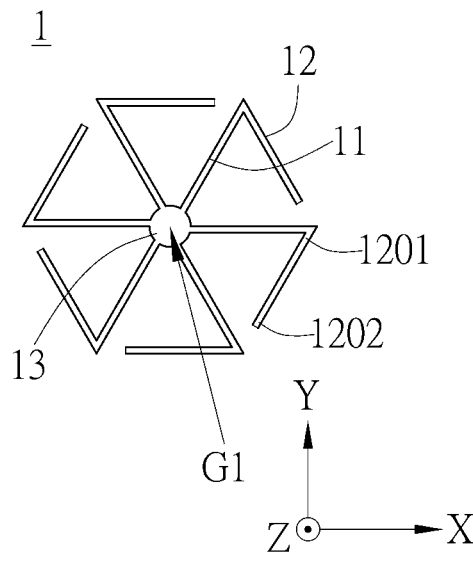
FIG. 4A is a schematic view showing a varied embodiment of the first radiation unit according to the first embodiment of the present invention.
Figure 4B:
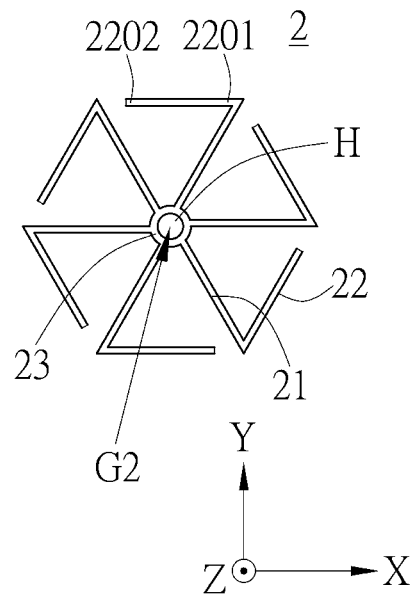
FIG. 4B is a schematic view showing a varied embodiment of the second radiation unit according to the first embodiment of the present invention.

With reference to FIG. 1 to FIG. 3, the second end 1202 of each of the first annular radiation portions 12 extends in a circular path towards the first end 1201 of the adjacent first annular radiation portion 12 such that the plurality of first annular radiation portion 12 defines a circular structure with the first geometric center G1 being the center. Similarly, the second end 2202 of each of the second annular radiation portions 22 extends in a circular path towards the first end 2201 of the adjacent second annular radiation portion 22 such that the plurality of second annular radiation portion 12 defines a circular structure with the second geometric center G2 being the center. Furthermore, the present invention is not limited to the above-mentioned embodiment. FIG. 4A and FIG. 4B show a varied embodiment of the first radiation unit 1 and the second radiation unit 2. Referring to FIG. 4A, in the present invention, the second end 1202 of each of the first annular radiation portions 12 extends in a linear path towards the first end 1201 of the adjacent first annular radiation portion 12 such that the plurality of first annular radiation portions 12 defines a polygon structure. Similarly, the second end 2202 of each of the first annular radiation portions 12 extends in a linear path towards the first end 2201 of the adjacent first annular radiation portion 12 such that the plurality of second annular radiation portions 22 defines a polygon structure.

In addition, each first annular radiation portion 12 in FIG. 4A has the same length such that the plurality of first annular radiation portions 12 form a regular hexagon structure; however, the present invention is not limited thereto. In other embodiments wherein opposite first annular radiation portions 12 are of the same length such that the polygon structure defined by the plurality of first annular radiation portions 12 is in point symmetry with respect to the first geometric center G1, the antenna structure U achieves circular polarization. Furthermore, the second connecting portions 21 and the second annular radiation portions 22 of the second radiation unit 2 have the same structure as the first connecting portions 11 and the first annular radiation portions 12 of the first radiation unit 1, and are arranged in mirror symmetry to the first connecting portions 11 and the first annular radiation portions 12 of the first radiation unit 1 with respect to the XY plane. Specifically, to achieve circular polarization, horizontal and vertical electromagnetic field components provided by the antenna structure U must be perpendicular to each other. Therefore, the antenna structure U is preferably point symmetric to the central point of the first conductive wire 3.

Figure 5:
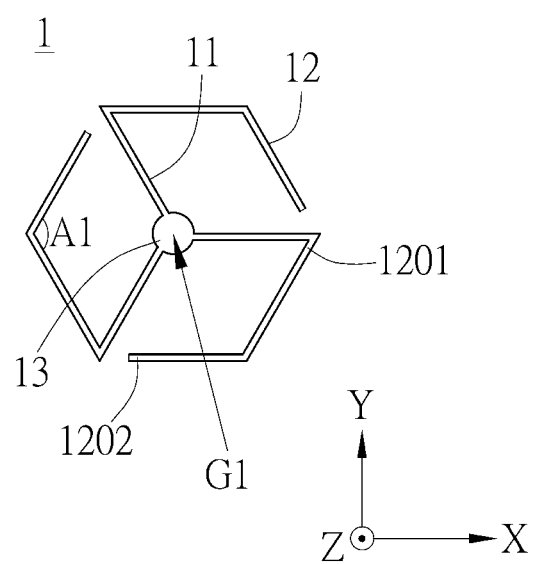
FIG. 5 is a schematic view showing another varied embodiment of the first radiation unit according to the first embodiment of the present invention.

Please refer to FIG. 5, which illustrates another varied embodiment of the first radiation unit 1. At least one first angle A1 is formed between the first end 1201 and the second end 1202 in each of the first annular radiation portions 12, and the second end 1202 of each first annular radiation portion 12 is near the first end 1201 of the adjacent first annular radiation portion 12 such that the plurality of first annular radiation portions 12 define a polygon structure in the XY plane with respect to the first geometric center G1.

In summary, in the present embodiment, the first conductive wire 3 and the second conductive wires 4 produce electromagnetic fields perpendicular to the XY plane, and the first annular radiation portions 12 and the second annular radiation portions 22 produce electromagnetic fields parallel to the XY plane so as to achieve circularly-polarized antenna pattern. Furthermore, the first end 1201 of each of the first annular radiation portions 12 extends towards the second end 1202 in a direction opposite that in which the first end 2201 of each of the second annular radiation portions 22 extends towards the second end 2202, and the second conductive wires 4 are respectively connected between the second end 2102 of each first annular radiation portion 12 and the second end 2202 of each second annular radiation portion 22. In this way, antenna signals are transmitted clockwise in both the first annular radiation portions 12 and the second annular radiation portions 22, thereby preventing the signals from self-interference when transmitted in the antenna structure U.

Second Embodiment

Figure 6:
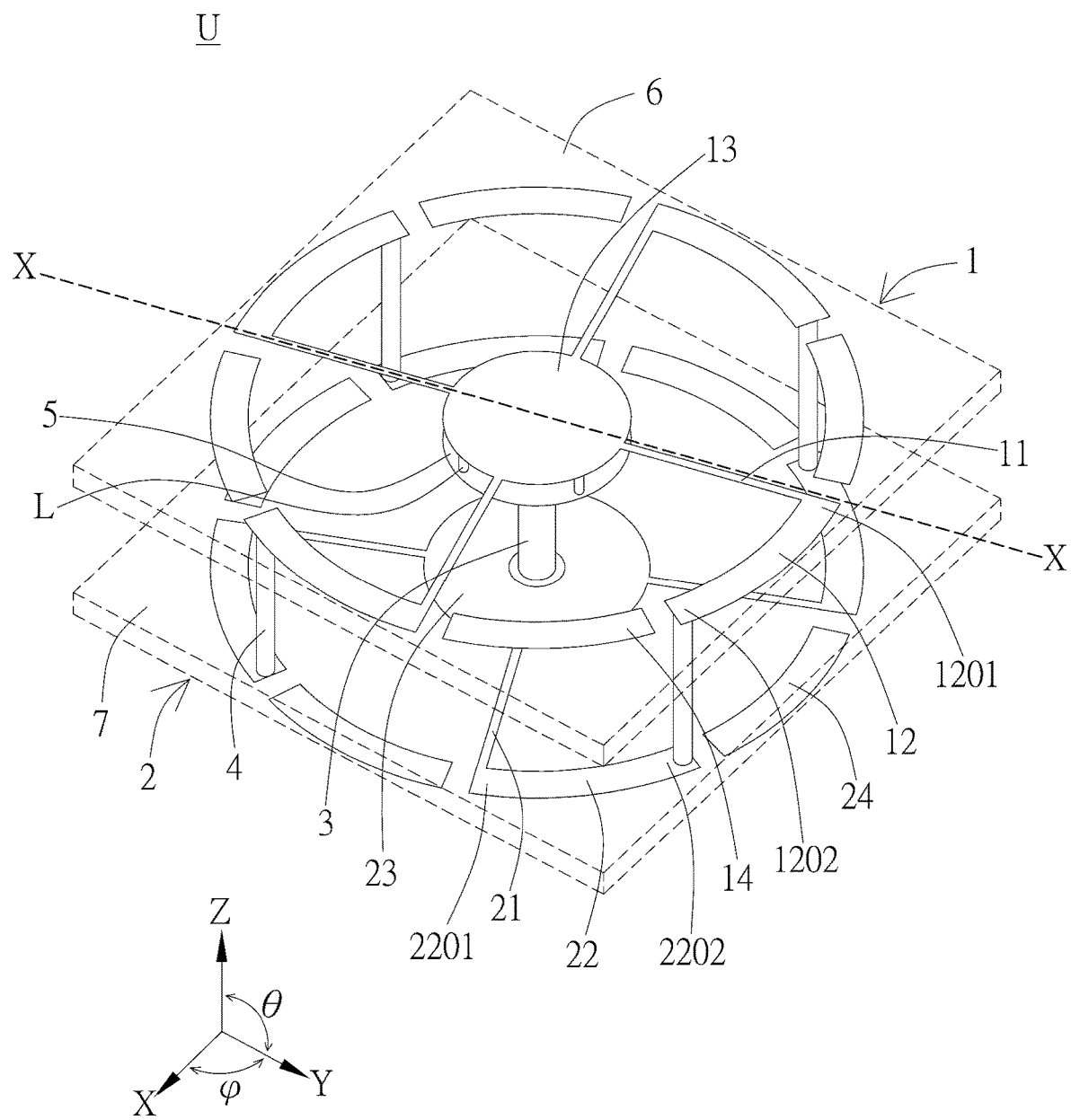
FIG. 6 is a schematic view showing an antenna structure according to a second embodiment of the present invention.
Figure 7C:
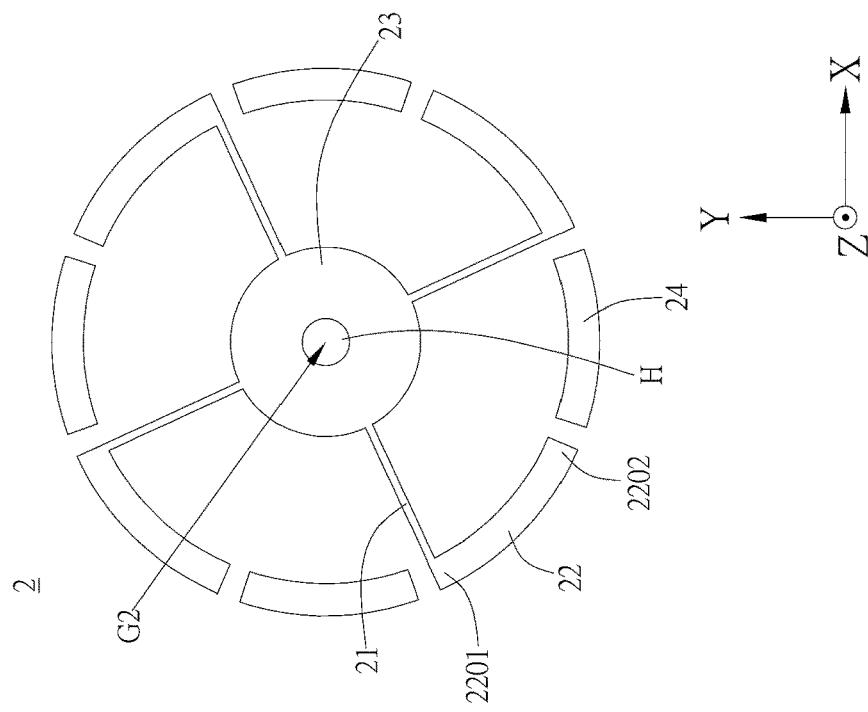
FIG. 7C is a top view showing a second radiation unit according to the second embodiment of the present invention.
Figure 7B:
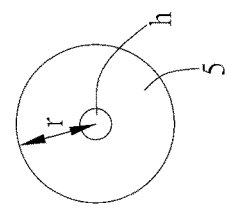
FIG. 7B is a top view showing a third radiation unit according to the second embodiment of the present invention.
Figure 7A:
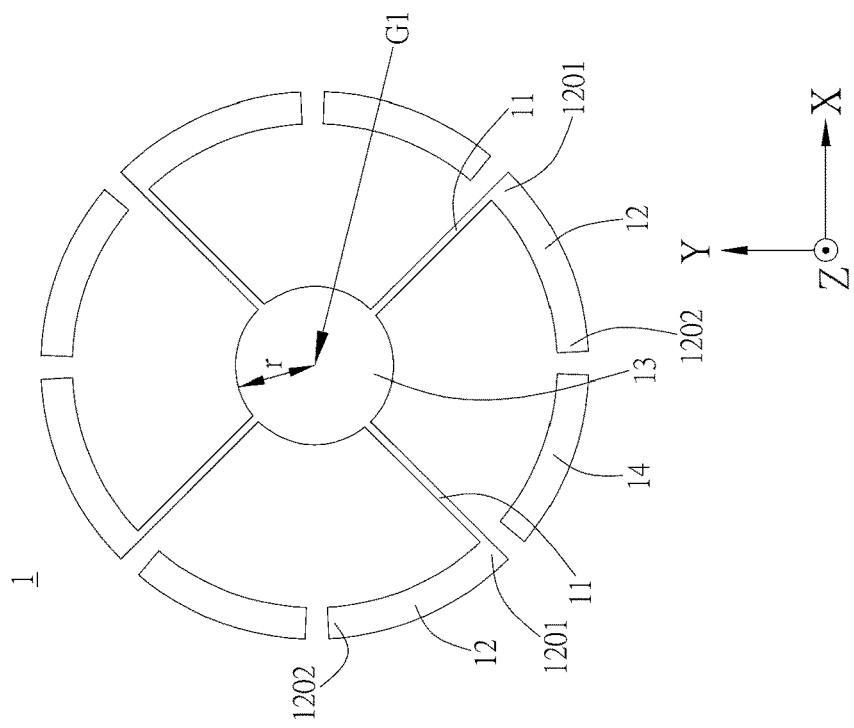
FIG. 7A is a top view showing a first radiation unit according to the second embodiment of the present invention.
Figure 8:
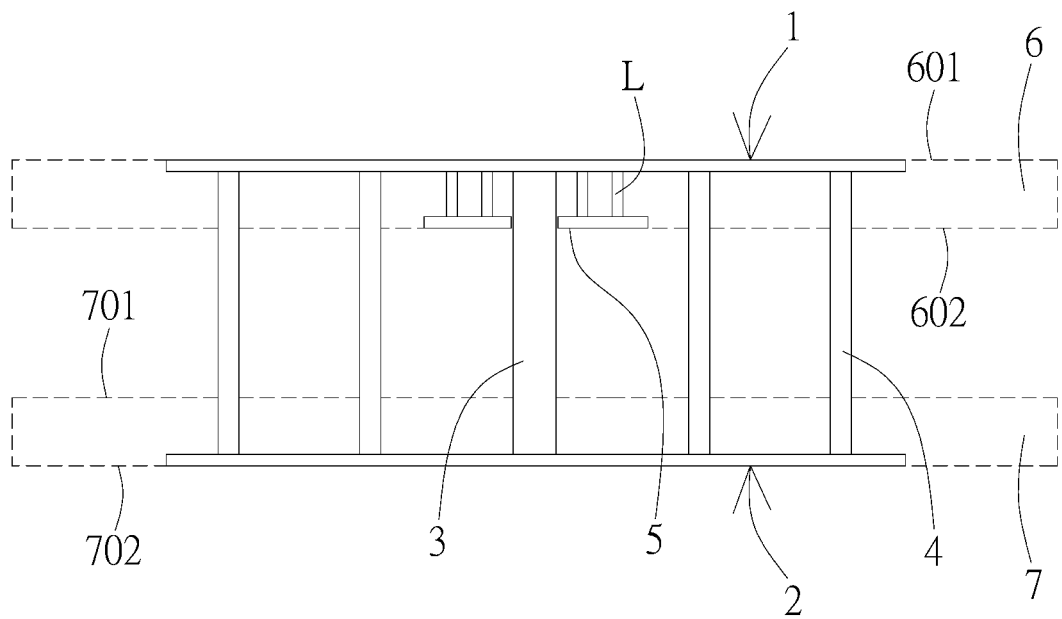
FIG. 8 is a sectional view of the antenna structure according to the second embodiment of the present invention.

The antenna structure U according to the second embodiment of the present invention is described below with reference to FIG. 6 to FIG. 8, wherein FIG. 6 shows the antenna structure U according to the second embodiment, FIG. 7A to FIG. 7C respectively show the first radiation unit 1, the first conductive wire 3, and the second radiation unit 2 of the antenna structure U as seen from +Z-direction towards −Z-direction, and FIG. 8 shows the side view of the antenna structure U of FIG. 6.

One of the differences between the present embodiment and the first embodiment is that the antenna structure U of the present embodiment further includes a plurality of first coupling components 14 and a plurality of second coupling components 24. Specifically, referring to FIG. 6 and FIG. 7A, each first coupling component 14 is disposed between two first annular radiation portions 12. In this embodiment, the second end 1202 of each first annular radiation portion 12 extends towards the adjacent first annular radiation portion 12 in a circular path, and each first coupling component 14 is arc-shaped such that the plurality of first annular radiation portions 12 together with the plurality of first coupling components 14 form a circular structure with the first geometric center G1 being the center.

Referring to FIG. 6 and FIG. 7C, each second coupling component 24 is disposed between two second annular radiation portions 22. The second end 2202 of each second annular radiation portion 22 extends towards the adjacent second annular radiation portion 22 in a circular path, and each second coupling component 24 is arc-shaped such that the plurality of second annular radiation portions 22 together with the plurality of second coupling components 24 form a circular structure with the first geometric center G1 being the center. More specifically, to achieve circularly-polarized antenna pattern, the two electromagnetic fields perpendicular to each other must be equal in magnitude; therefore, the plurality of first coupling components 14 and the plurality of second coupling components 24 are provided in this embodiment to make minute adjustment to the electromagnetic field of the antenna structure U via coupled current.

Please refer to FIG. 6, FIG. 7A and FIG. 7B. Another difference between the present embodiment and the first embodiment is that the antenna structure U of the present embodiment further includes the third coupling component 5 situated between the first radiation unit 1 and the second radiation unit 2, and connected to the plurality of first connecting portions 11 through the third conductive wires L. The third radiation unit 5 has a through hole h for the first conductive wire 3 to pass through. Specifically, the third radiation unit 5 and the first center portion 13 are in the same shape and with the same radius; however, the present invention is not limited thereto.

The present embodiment provides the antenna structure U with the third radiation unit 5 such that a part of antenna signals entering the first radiation unit 1 through the first conductive wire 3 can further enter the third radiation unit 5 through the third conductive wires L, thereby lengthening the current path and broadening the operating frequency band of the antenna structure U.

Please refer to FIG. 6 and FIG. 8, which illustrate the side view of FIG. 6. The present embodiment shows the antenna structure U disposed on the first substrate 6 and the second substrate 7. As shown in FIG. 8, the first radiation unit 1 is disposed on the upper surface 601 of the first substrate 6, the third radiation unit 5 is disposed on the bottom surface 602 of the first substrate 6, and the second radiation unit 2 is disposed on the lower surface 702 of the second substrate 7. The first conductive wire 3 and the second conductive wires 4 penetrate through the bottom surface 602 of the first substrate 6 and the upper surface 701 of the second substrate 7 so as to connect the first radiation unit 1 and the second radiation unit 2. It should be noted that the antenna structure U can be formed in a way other than being disposed on the first substrate 6 and the second substrate 7 in other embodiments.

Figure 9A:
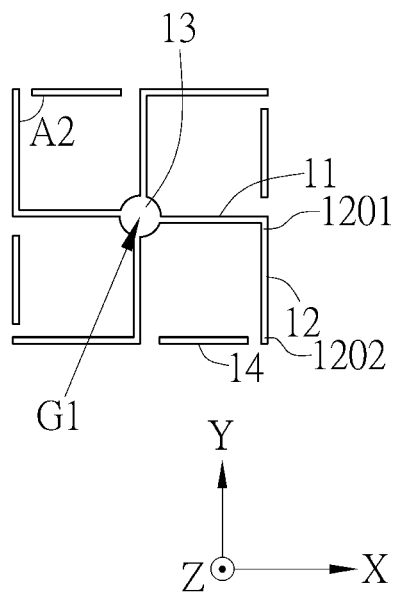
FIG. 9A is a schematic view showing a varied embodiment of the first radiation unit according to the second embodiment of the present invention.
Figure 9B:
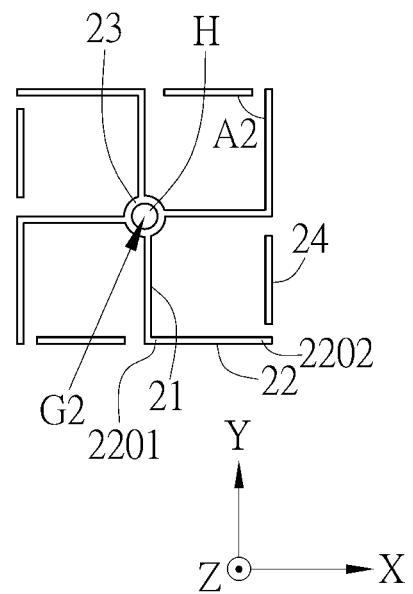
FIG. 9B is a schematic view showing a varied embodiment of the second radiation unit according to the second embodiment of the present invention.

FIG. 9A and FIG. 9B shows the first radiation unit 1 and the second radiation unit 2 of a varied embodiment. One of the differences between the present embodiment and the embodiment of FIG. 7 is that the second end 1202 of the first annular radiation portions 12 in FIG. 6 extends in a circular path towards the adjacent first annular radiation portion 12, and the first coupling components 14 are arc-shaped so that the first annular radiation portions 12 and the first coupling components 14 form a circular structure with the first geometric center G1 being the center of the circle, whereas in FIG. 9, the first annular radiation portions 12 extends in a linear path, and form at least one second angle A2 with the corresponding first coupling component 14 in the XY plane so that the plurality of first annular radiation portions 12 together with the plurality of first coupling components 14 define a polygon structure in point symmetry with respect to the first geometric center G1.

Referring to second radiation unit 2 of FIG. 9B, which has a structure corresponding to that of the first radiation unit 1 in FIG. 9A, each second annular radiation portion 22 together with the corresponding second coupling components 24 form at least one second angles A2 such that the plurality of second annular radiation portions 22 and the plurality of second coupling components 24 define a polygon structure in point symmetry with respect to the second geometric center G2. Specifically, the transmission path of antenna signals in the first radiation unit 1 and the second radiation unit 2 of this embodiment is similar to that in the first embodiment and the second embodiment. That is to say, the antenna signals are transmitted from first end 1201 of each of the first annular radiation portions 12 of the first radiation unit 1 in FIG. 9A to the second end 1202, then to the second end 2202 of each of the second annular radiation portions 22 in FIG. 9B through the second conductive wires 4, and finally enter the second connecting portions 21 via the first end 2201 of each of the second annular radiation portions 22 and output at the second geometric center G2.

The first coupling components 14 and the second coupling components 24 in FIG. 9A and FIG. 9B function similarly as the first coupling components 14 and the second coupling components 24, that is, to produce currents to adjust the electromagnetic field of the antenna structure U. It should be noted that in FIG. 9A and FIG. 9B, the first annular radiation portions 12 form only one angle with corresponding first coupling component 14 so that a quadrilateral in formed; however, the present invention is not limited thereto. In other embodiments, the first annular radiation portions 12 can form a plurality of angles with corresponding first coupling component 14.

Figure 10:
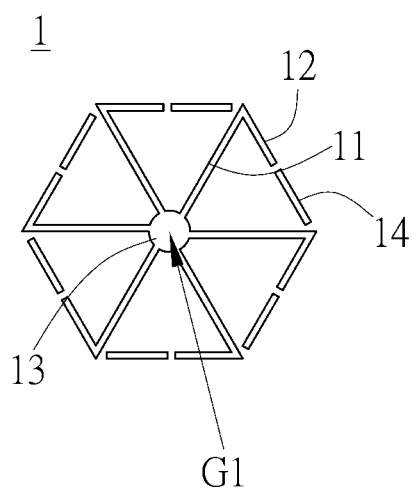
FIG. 10 is a schematic view showing another varied embodiment of the first radiation unit according to the second embodiment of the present invention.

FIG. 10 illustrates another varied embodiment of the first annular radiation portions 12 according to the second embodiment. The main difference between FIG. 10 and FIG. 9A is that the first annular radiation portions 12 and the coupling components 14 respectively define different sides of a polygon in FIG. 9A, while in FIG. 10, each of the first annular radiation portions 12 form a side of the polygon with a first coupling component 14.

In summary, the antenna structure U of the second embodiment of the present invention further includes the first coupling components 14, the second coupling components 24, and the third radiation unit 5 compared to that of the first embodiment. In the present embodiment, the technical solution of incorporating the first coupling components 14 and the second coupling components 24 into the antenna structure U is utilized to produce coupled currents so as to make minute adjustment to the electromagnetic field components perpendicular to the first conductive wire 3 and the second conductive wires 4. Moreover, the present embodiment utilizes the third radiation unit 5 to extend the transmission path of antenna signals in the antenna structure U, thereby broadening the operating frequency band of the antenna structure U.

The antenna pattern of the antenna structure U in FIG. 6 are shown in FIG. 11A to FIG. 11C, FIG. 12A to FIG. 12C, and FIG. 13A to FIG. 13C. In the present embodiment, the length of the first conductive wire 3 and the second conductive wires 4 is approximately 9.2 mm l the length of the third conductive wires L is approximately 1.6 mm; the outer diameter of the first radiation unit 1 and the second radiation unit 2 is approximately 32.8 mm; the width of the first annular radiation portions 12 and the second annular radiation portions 22 is approximately 2 mm; the central angle of each of the first annular radiation portions 12 and each of the second annular radiation portions 22 is approximately 36 degrees; the central angle of each of the first coupling components 14 and each of the second coupling components 24 is approximately 44 degrees; the width of the first connecting portions 11 and the second connecting portions 21 is approximately 1.4 mm; the diameter of the first center portion 13 and the third radiation unit 5 is approximately 5 mm; and the diameter of the second center portion 23 is approximately 7 mm.

Figure 11A:
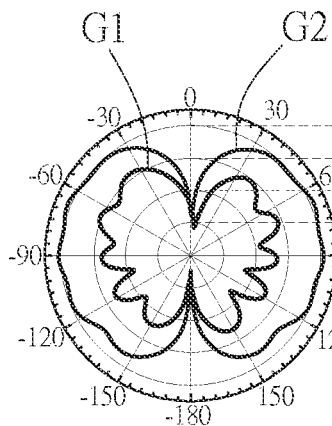
FIG. 11A to FIG. 11C are radiation patterns of the antenna structure according to the second embodiment of the present invention in the XZ plane.
Figure 11B:
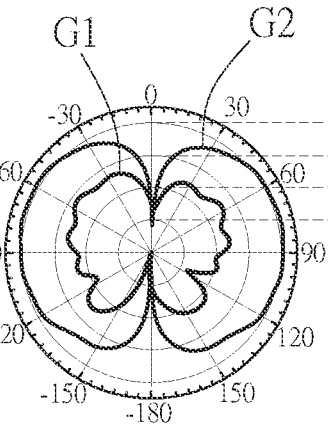
Figure 11C:
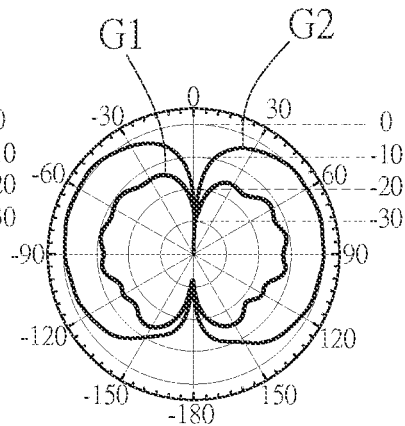
Figure 12A:
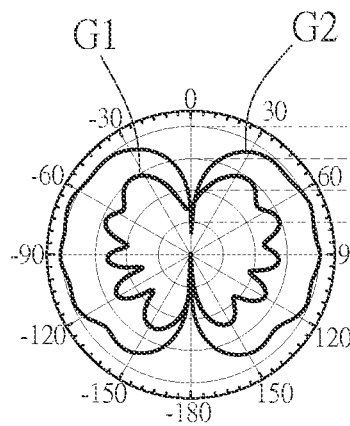
FIG. 12A to FIG. 12C are radiation patterns of the antenna structure according to the second embodiment of the present invention in the YZ plane.
Figure 12B:
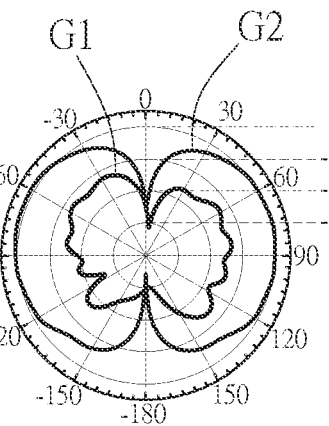
Figure 12C:
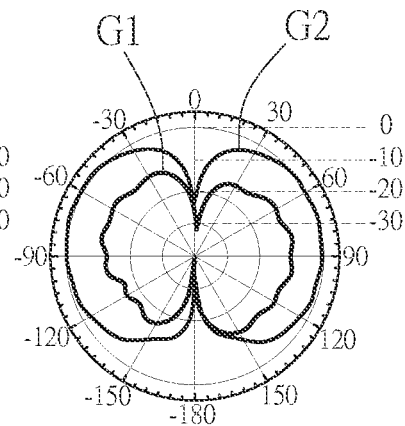
Figure 13A:
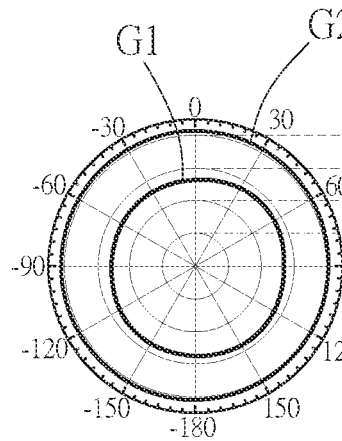
FIG. 13A to FIG. 13C are radiation patterns of the antenna structure according to the second embodiment of the present invention in the XY plane.
Figure 13B:
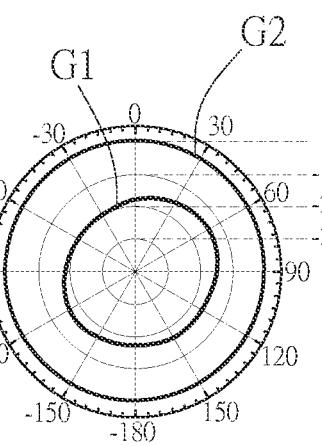
Figure 13C:
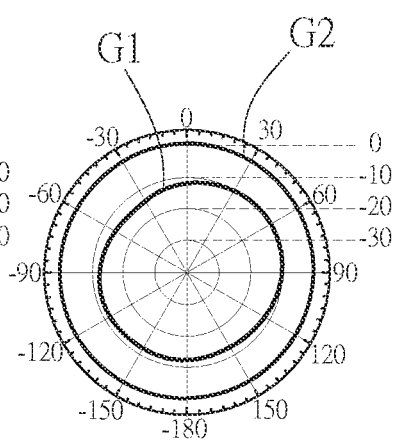
Figure 14A:
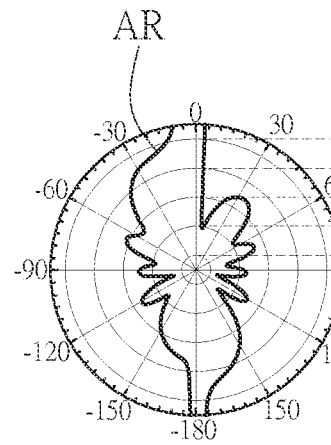
FIG. 14A to FIG. 14C are axial ratio diagrams of the antenna structure according to the second embodiment of the present invention in the XZ plane.
Figure 14B:
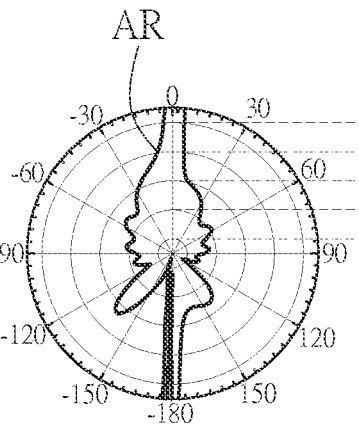
Figure 14C:
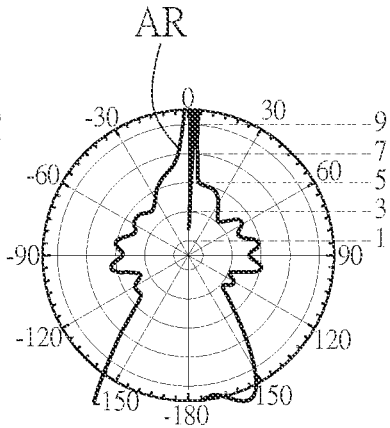

FIG. 11A to FIG. 11C respectively show the antenna pattern of the antenna structure U at 3.2 GHz, 3.5 GHz, and 3.8 GHz in the XZ plane. FIG. 12A to FIG. 12C respectively show the antenna pattern of the antenna structure U at 3.2 GHz, 3.5 GHz, and 3.8 GHz in the YZ plane. FIG. 13A to FIG. 13C respectively show the antenna pattern of the antenna structure U at 3.2 GHz, 3.5 GHz, and 3.8 GHz in the XY plane. In the above-mentioned figures, G1 is used to mark the gain of left-hand polarized electromagnetic waves, and G2 is used to mark the gain of right-hand polarized electromagnetic waves. According to FIG. 11A, FIG. 11B, FIG. 12A to FIG. 12C, and FIG. 13A to FIG. 13B, the gain of right-hand polarized electromagnetic waves is greater than that of left-hand polarized electromagnetic waves by 10 dB in the XY plane, the YX plane and the XY plane at all the operating frequency bands except for within the region of ±15 degrees about the Z axis. Therefore, based on the above-mentioned figures, the present embodiment achieves omnidirectional circularly polarized antenna structure U.

Figure 15A:
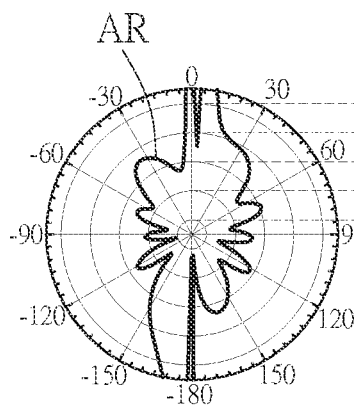
FIG. 15A to FIG. 15C are axial ratio diagrams of the antenna structure according to the second embodiment of the present invention in the YZ plane.
Figure 15B:
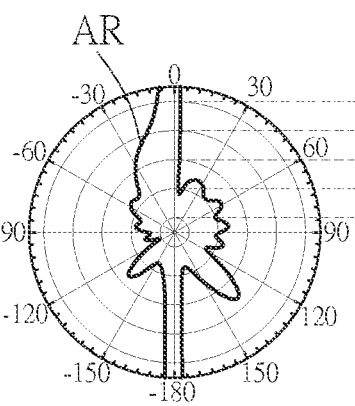
Figure 15C:
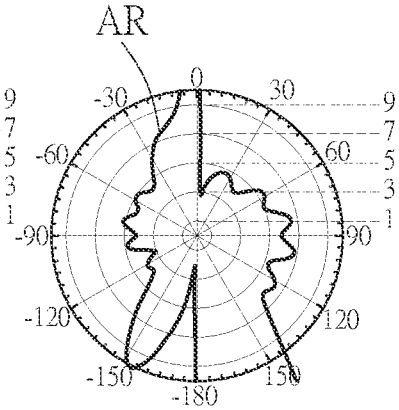
Figure 16A:
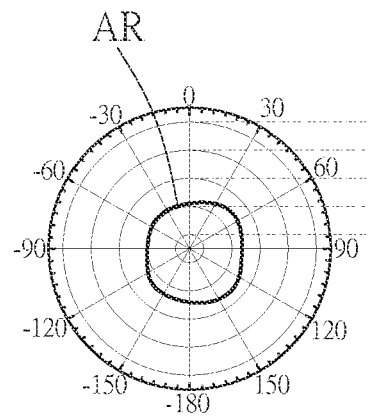
FIG. 16A to FIG. 16C are axial ratio diagrams of the antenna structure according to the second embodiment of the present invention in the XY plane.
Figure 16B:
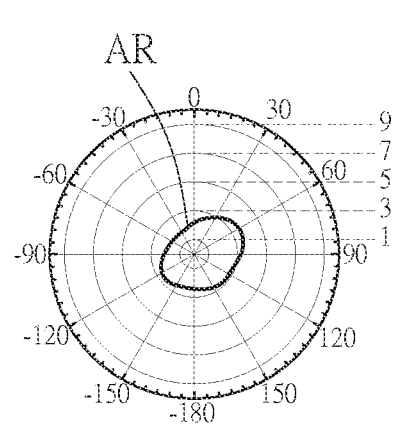
Figure 16C:
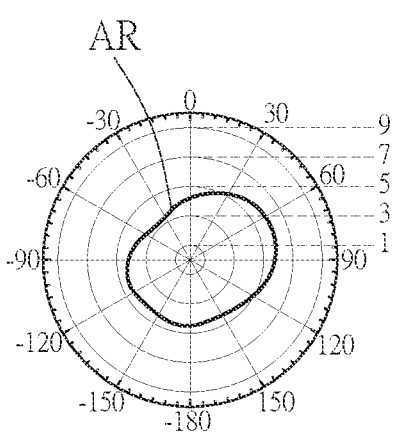

FIG. 14A to FIG. 14C, FIG. 15A to FIG. 15C, and FIG. 16A to FIG. 16C show the axial ratio of the antenna structure U according to the present embodiment. In the figures mentioned above, the curves marked AR illustrate the axial ratio of the antenna structure U at different frequency bands and different orientations. Specifically, FIG. 14A to FIG. 14C, FIG. 15A to FIG. 15C, and FIG. 16A to FIG. 16C show the axial ratio of the antenna structure U at 3.2 GHz, 3.5 GHz, and 3.8 GHz in the XZ plane; FIG. 15A to FIG. 15C show the axial ratio of the antenna structure U at 3.2 GHz, 3.5 GHz, and 3.8 GHz in the YZ plane; FIG. 16A to FIG. 16C show the axial ratio of the antenna structure U at 3.2 GHz, 3.5 GHz, and 3.8 GHz in the XY plane. It can be derived from FIG. 14A to FIG. 16C that the axial ratio of the antenna structure U is equal to or smaller than 3 dB at the operating frequency bands except for within the region of ±15 degrees about the Z axis. Therefore, according to the above-mentioned figures, the antenna structure U of the present embodiment achieves omnidirectional circularly-polarized antenna pattern.

Third Embodiment

Figure 17:
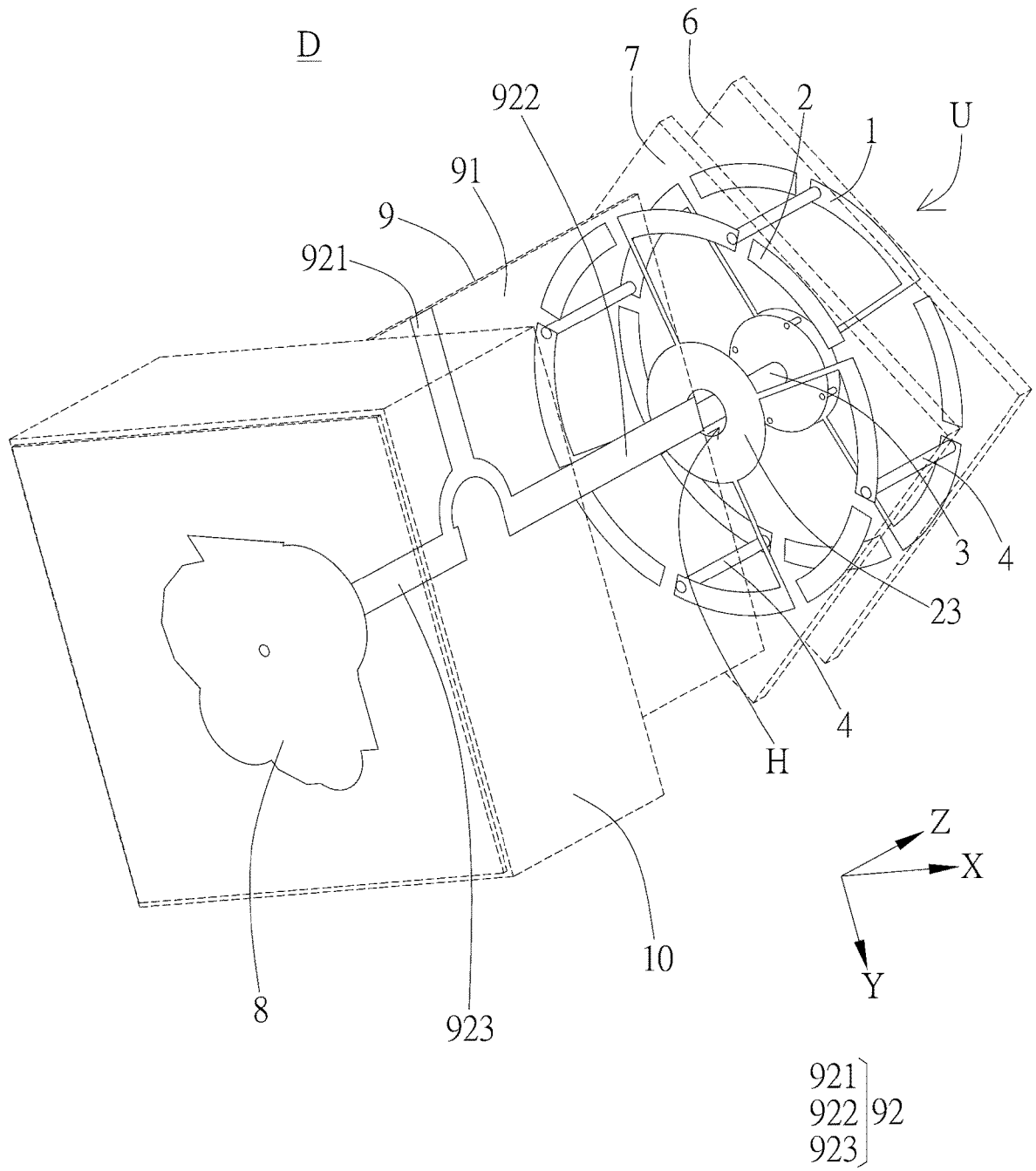
FIG. 17 is a schematic view showing an antenna device according to a third embodiment of the present invention.

Referring to FIG. 17, the present embodiment provides an antenna device D. The antenna device D includes the aforementioned antenna structure U, a power splitting unit 9 and a chamber 10. As shown in FIG. 17, the power splitting unit 9 is exemplified as a microstrip antenna. Specifically, the power splitting unit 9 includes a third substrate 91 and a microstrip circuit 92. The microstrip circuit 92 includes a feeding portion 921, a first pathway portion 922, and a second pathway portion 923. The feeding portion 921 is connected between the first pathway portion 922 and the second pathway portion 923. The end of the first pathway portion 922 away from the feeding portion 921 is connected to the first conductive wire 3, and the end of the second pathway portion 923 away from the feeding portion 921 is connected to the fourth radiation unit 8. In the present embodiment, the feeding portion 921 of the power splitting unit 9 is used for receiving antenna signals and transmitting the antenna signals to the first pathway portion 922 and the second pathway portion 923. Afterwards, a part of antenna energy entering the first conductive wire 3 is transmitted to the first conductive wire 3 via the first pathway portion 922, and then into the first radiation unit 1 through the first conductive wire 3, and another part thereof is transmitted to the fourth radiation unit 8 via the second pathway portion 923.

In the present embodiment, the fourth radiation unit 8 is used for radiating a circularly-polarized antenna pattern parallel to the first conductive wire 3. To be specific, the fourth radiation unit 8 provides circularly-polarized pattern in the −Z direction so as to complement the antenna patterns of the first radiation unit 1, the second radiation unit 2, the first conductive wire 3, and the second conductive wires 4, compensating for the radiation of the antenna structure U around the Z axis that is weaker compared to other regions.

In this way, the antenna device D achieves enhanced omnidirectional circular-polarized pattern. In addition, since the fourth radiation unit 8 also emits linearly-polarized radiation pattern parallel to the XY plane, and the radiation pattern of the first radiation unit 1, the second radiation unit 2, the first conductive wire 3, and the second conductive wires 4 near the Z axis is nearly linearly-polarized, the present embodiment is preferably provided with a chamber 10 disposed between the fourth radiation unit 8 and the second radiation unit 2, as shown in FIG. 17. The chamber 10 is used for shielding −Z oriented linearly-polarized radiation emitted by the first radiation unit 1, the second radiation unit 2, the first conductive wire 3, and the second conductive wires 4, and the linearly-polarized radiation of the second conductive wires 4 in the XY plane. With the technical solution stated above, the fourth radiation unit 8, the power splitting unit 9 together with the chamber 10 achieves enhanced omnidirectional circularly-polarized pattern of the antenna structure U. It should be noted that the power splitting unit can be exemplified as other devices, and is not limited to the microstrip antenna in the above-mentioned embodiment. Furthermore, the chamber 10 in the present embodiment is used for shielding linear polarization so as to optimize the circular polarization effect of the antenna device D; however, the present invention is not limited thereto. In other embodiments, the antenna device D can be dispensed with the chamber 10.

The present invention is not limited to the type and shape of the fourth radiation unit 8. In the embodiment of FIG. 17, the fourth radiation unit 8 is exemplified as an irregularly-shaped patch antenna; however, the present invention is not limited thereto. In other embodiments, the fourth radiation unit 8 can be any type of antenna that emits a circularly-polarized pattern parallel to the first conductive wire 3. For instance, in another embodiment shown in FIG. 18, the fourth radiation unit 8 is exemplified as a spiral antenna.

Figure 18:
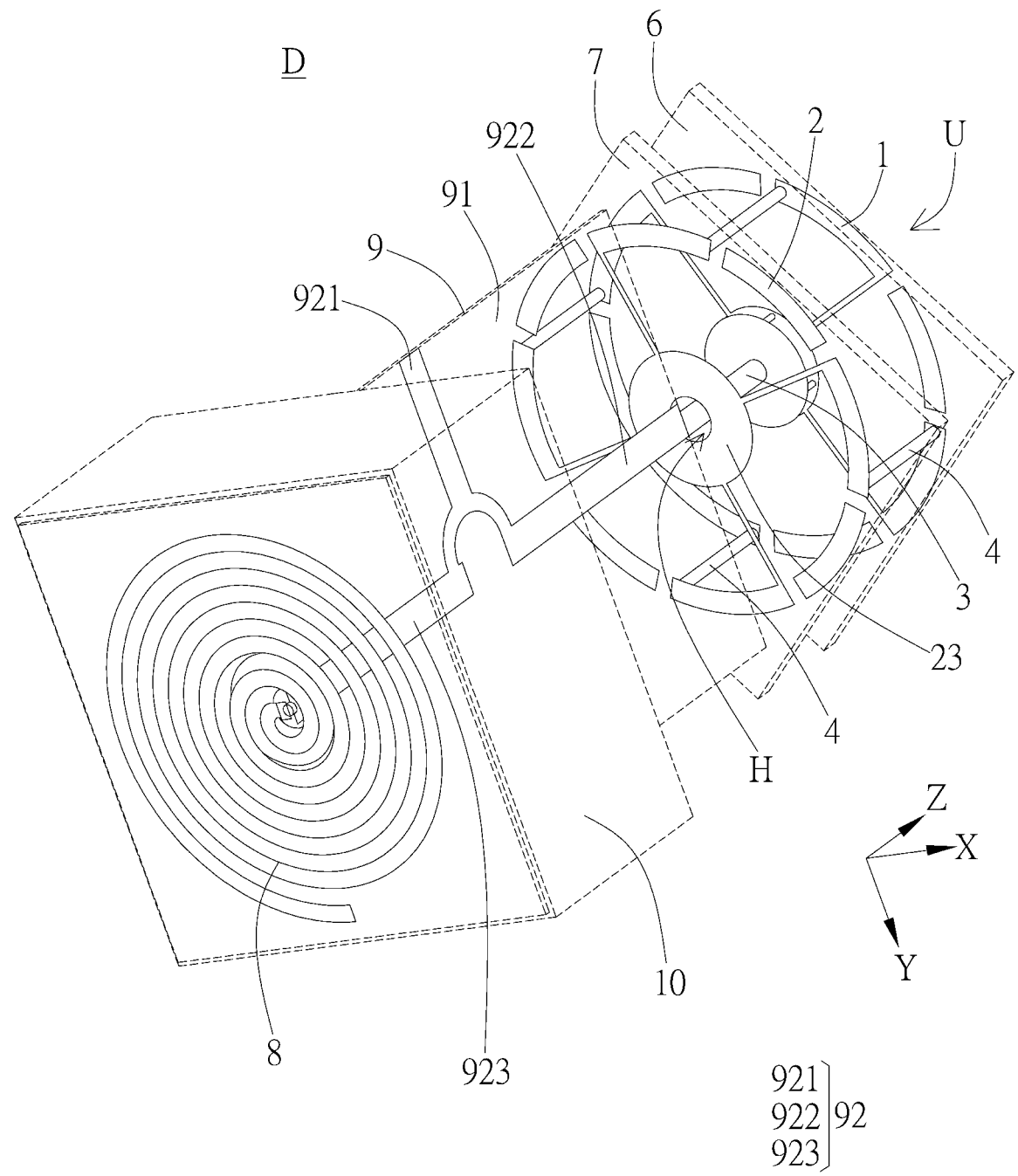
FIG. 18 is a schematic view showing a varied embodiment of the antenna device according to the third embodiment of the present invention.

In addition, in FIG. 17 and FIG. 18, the fourth radiation unit 8 is disposed on a side of the antenna structure U near the second radiation unit 2, and contributes to radiation in the −Z direction. However, the present invention is not limited thereto. In another embodiment, the fourth radiation unit 8 can be disposed on a side of the antenna structure U near the first radiation unit 1, and contribute to radiation in the +Z direction. In yet another embodiment, the antenna device D can have two fourth radiation units 8 respectively disposed on the side of the antenna structure U near the first radiation unit 1 and another side near the second radiation unit 2, and contribute to radiation in the +Z direction and the −Z direction respectively so as to enhance omnidirectional circular-polarized radiation pattern.

In summary, the first embodiment, the second embodiment and the third embodiment provide the antenna structure U that achieve the technical feature of "the first end of each first annular radiation portion extends towards the second end in a direction opposite that in which the first end extends towards the second end in each second annular radiation portion with respect to the first conductive wire" with the technical solutions of "the first radiation unit includes a plurality of first connecting portions and the plurality of first annular radiation portions", "the second radiation unit includes a plurality of second connecting portions and the plurality of second annular radiation portions" and "each second conductive wire is connected between the second end of each first annular radiation portion and the second portion of each second annular radiation portion".

Fourth Embodiment

Figure 19:
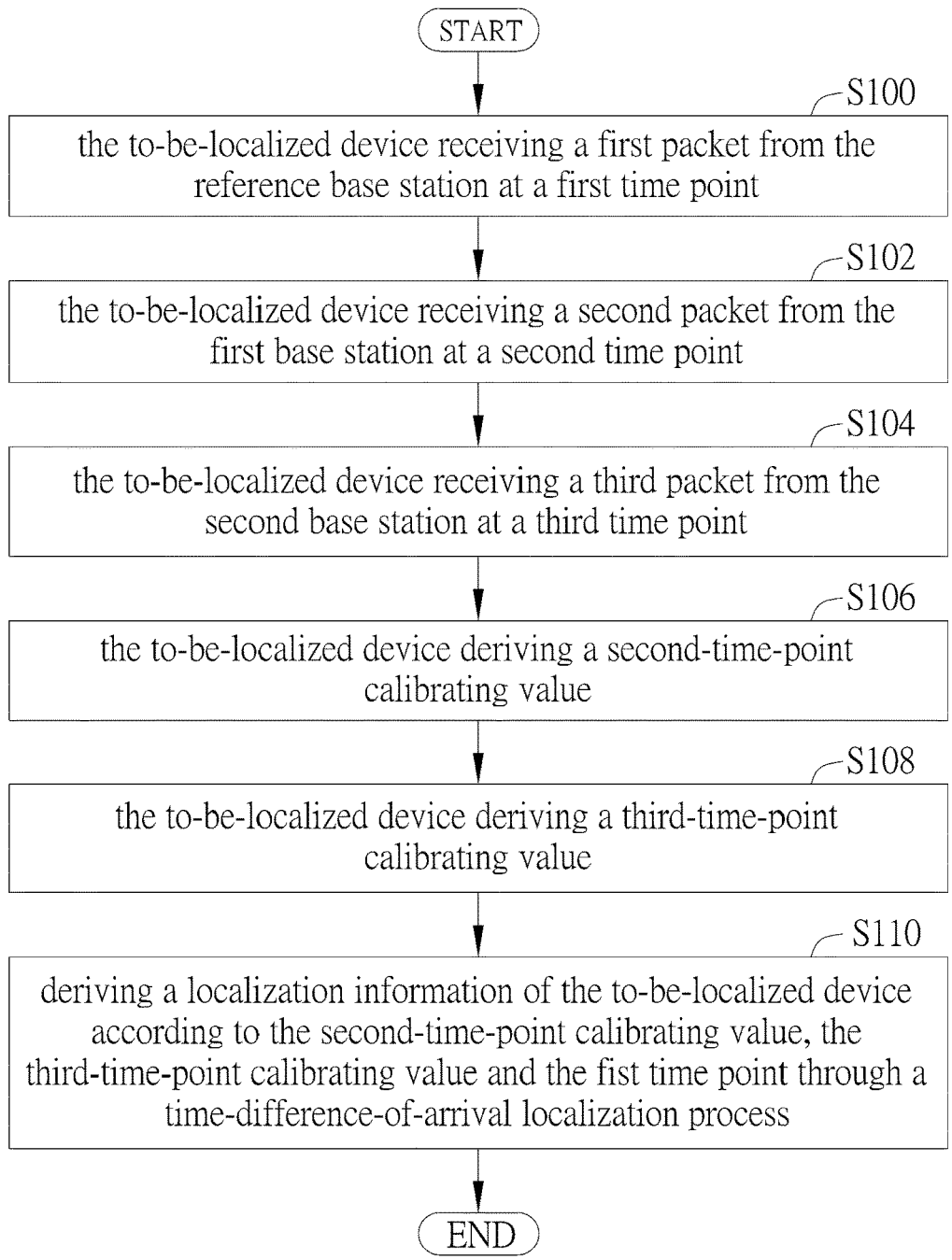
FIG. 19 is a flow chart showing a wireless localization method according to a fourth embodiment of the present invention.

Please refer to FIG. 19 and FIG. 20. FIG. 19 is a flow chart showing a wireless localization method provided by the fourth embodiment of the present invention, which is applicable to a localization system. The localization system includes at least one to-be-localized device, a reference base station, and at least two base stations. In the present embodiment, the localization system includes two base stations, i.e. the first base station and the second base station, and a to-be-localized device. However, the present invention is not limited thereto. FIG. 20 shows timelines according to the wireless localization method of the present embodiment, in which timeline A is the timeline of the reference base station; timeline B is that of the to-be-localized device; timeline C is that of the first base station; and timeline D is that of the second base station.

Please refer to FIG. 19 and FIG. 20. The wireless localization method of the present embodiment includes the following steps: step S100: the to-be-localized device receiving a first packet Si from the reference base station at a first time point $t_r$; step S102: the to-be-localized device receiving a second packet S2 from the first base station at a second time point $t_{at1}$. Specifically, the second packet S2 includes a first response time information $t_{r1}$, a first clock correcting coefficient of the first base station with respect to the reference base station, and a first transmission time information, in which the first response time information corresponding to the time needed for the first base station to process information sent from the reference base station, and the first transmission time information corresponding to the transmission time between first base station and the reference base station. The method further includes step S104: the to-be-localized device receiving a third packet from the second base station at a third time point. Specifically, the third packet S3 includes a second response time information $t_{r2}$, a second clock correcting coefficient of the second base station with respect to the reference base station, and a second transmission time information, in which the second response time information corresponding to the time needed for the second base station to process information sent from the reference base station, and the second transmission time information corresponding to the transmission time between second base station and the reference base station. Next, step S106 follows: the to-be-localized device deriving a second-time-point calibrating value. Specifically, the to-be-localized device derives the second-time-point calibrating value according to the second time point $t_{at1}$, the first response time information $t_{r1}$, the first clock correcting coefficient, the first transmission time information and a third clock correcting coefficient of the to-be-localized device with respect to the reference base station. After step S106, step S108 follows: the to-be-localized device deriving a third-time-point calibrating value. Specifically, in step S108, the to-be-localized device derives the third-time-point calibrating value according to the third time point $t_{at2}$, the second response time information $t_{r2}$, the second clock correcting coefficient, the second transmission time information and the third clock correcting coefficient. After step S108, step S110 follows: deriving a localization information of the to-be-localized device. Specifically, the localization information is derived in step S110 according to the second-time-point calibrating value, the third-time-point calibrating value and the first time point through a time-difference-of-arrival localization process.

Furthermore, the first base station can derive the first response time information $t_{r1}$, the first clock correcting coefficient and the first transmission time information by performing a packet exchange mechanism with the reference base station. In the present embodiment, the aforementioned packet exchange mechanism is preferably symmetrical double-sided two-way ranging (SDS-TWR), wherein the reference base station performs message exchange with the first base station three times, thereby deriving four time differences. The four time differences can be used to calculate the time of flight (TOF) between the reference base station and the first base station, which, in the case of the present embodiment, is the first transmission time information mentioned above. The detailed calculation process of SDS-TWR is well-known techniques in the art, and therefore will not be further explained therein.

With reference to FIG. 21, in a varied embodiment, the ranging process between the first base station and the reference base station can be performed before step S100. That is to say, before the to-be-localized device receives the first packet, step S200 is performed: the first base station deriving the first response time information $t_{r1}$, the first clock correcting coefficient, and the first transmission time information through a packet exchange process.

Figure 22:
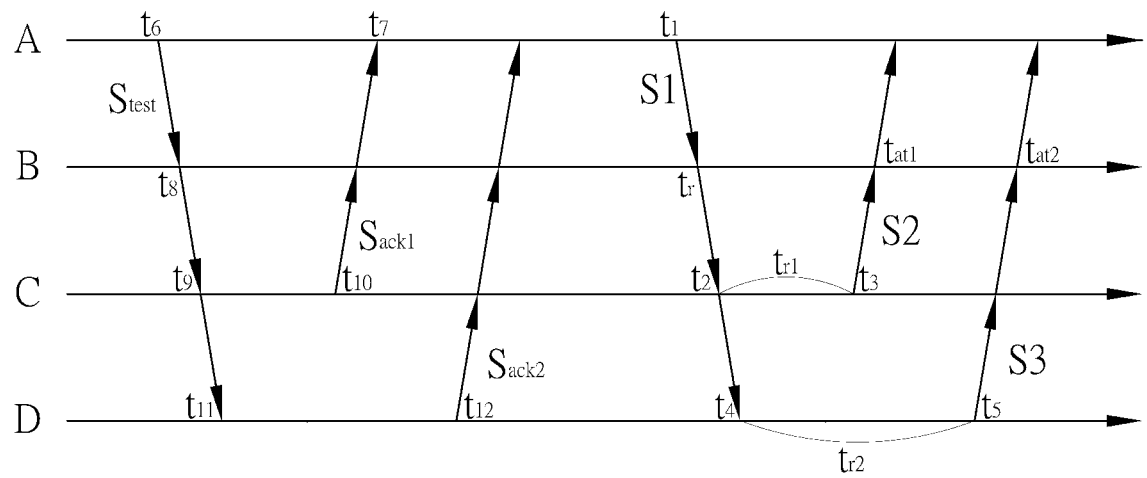
FIG. 22 shows another varied embodiment of the wireless localization method according to the fourth embodiment of the present invention.

Referring to FIG. 22, in another embodiment, step S200 can also be performed before step S102. Specifically, the first packet Si received by the to-be-localized device in step S100 can be the third exchanged packet in an SDS-TWR ranging process between the first base station and the reference base station. In step S102, the first base station receives a test packet $S_{test}$ at time point $t_9$, and responds with an acknowledgement packet $S_{ack1}$ at time point $t_{10}$. Next, the first base station receives the first packet S1 from the reference base station at time point $t_2$. When the first base station receives the first packet S1, the first base station calculates the time of flight between the first base station and the reference base station, i.e. the first transmission time information in the present embodiment, based on the receival time and sending time of the test packet $S_{test}$, acknowledgment packet $S_{ack1}$, and the first packet S1, and then send the first response time information $t_{r1}$, the first transmission time information, and the first clock correcting coefficient to the reference base station as a second packet S2. More specifically, the first response time information $t_{r1}$ is the time difference between the first base station receiving the first packet S1 and sending the second packet S2. Furthermore, the first clock correcting coefficient can be stored beforehand in the first base station before the wireless localization method of the present embodiment is performed, or the first base station derives the first clock correcting coefficient by calculation based on the time point $t_2$ at which the first base station receives the first packet S1, the time point $t_9$ at which the first base station receives the test packet $S_{test}$, the time point $t_1$ at which the reference base station sends the first packet S1, and the time point $t_6$ at which the reference base station sends the test packet $S_{test}$. The process of calculating the relative clock time coefficient is well known in the technical field. Moreover, the present invention is not limited to the way of deriving the first clock correcting coefficient or the time point at which the first clock correcting coefficient is derived.

Next, step S104 is performed, in which the second base station derives the second response time information $t_{r2}$, the second clock correcting coefficient, and the second transmission time information through an SDS-TWR ranging process. More specifically, the second transmission time information is the time of flight between the second base station and the reference base station. Furthermore, the aforementioned SDS-TWR ranging process between the second base station and the reference base station can be performed before step S100, and the derived second response time information $t_{r2}$, the second clock correcting coefficient, and the second transmission time information are stored in the second base station.

With reference FIG. 22, the SDS-TWR ranging measurement performed between the second base station and the reference base station can also be performed before step S104. Specifically, in step S100, the first packet S1 received by the to-be-localized device can be the packet transmitted in the third message exchange operation between the second base station and the reference base station. More specifically, in the present embodiment, the second base station receives a test packet $S_{test}$ from the reference base station at time point $t_{11}$, and responds by sending an acknowledgement packet $S_{ack2}$ at time point $t_{12}$. Next, the second base station receives the first packet S1 sent from the reference base station at time point $t_4$. When the second base station receives the first packet S1, the second base station can calculate the time of flight between the second base station and the reference base station, i.e. the second transmission time information in the present embodiment, based on the receival time and sending time of the test packet $S_{test}$, the acknowledgement packet $S_{ack2}$, and the first packet S1, and send the second response time information $t_{r1}$, the second transmission time information, and the second clock correcting coefficient to the reference base station as the third packet S3. Specifically, the second response time information $t_{r2}$ is the time difference between the second base station receiving the first packet S1 and sending the third packet S3. Furthermore, the second clock correcting coefficient can be stored in the second base station before the wireless localization method of the present embodiment is performed, or the second base station derives the second clock correcting coefficient by calculation based on the time point $t_4$ at which the second base station receives the first packet S1, the time point $t_{11}$ at which the second base station receives the test packet $S_{test}$, the time point $t_1$ at which the reference base station sends the first packet S1, and the time point $t_6$ at which the reference base station sends the test packet $S_{test}$. The process of calculating the relative clock correcting coefficient is well known in the art, and the present invention is not limited thereto.

Nest, in step S106, the to-be-localized device derives a second-time-point calibrating value according to the second time point $t_{at1}$, the first transmission time information, and the third clock correcting coefficient. Specifically, the to-be-localized device derives the second-time-point calibrating value according to equation (1) below:

$$t_{a1} = t_{at1} - t_{r1} \times \frac{r_3}{r_1} - TOF_1 \times r_3$$

In equation (1), $t_{a1}$ represents the second-time-point calibrating value, $r_3$ represents the third clock correcting coefficient, $TOF_1$ represents the first transmission time information. The time point at which the to-be-localized device receives the second packet S2 is modified in equation (1) by subtracting the response time $$t_{r1} \times \frac{r_3}{r_1},$$

which is from the first base station receiving the first packet S1 to the first base station sending the second packet S2. Moreover, time point at which the to-be-localized device receives the second packet S2 is further modified by subtracting the time of flight ($TOF_1 \times r_3$) between the first base station and the reference base station. Therefore, the second-time-point calibrating value $t_{a1}$ derived from equation (1) can be seen as the time point at which a second packet S2 sent by the first base station arrives at the to-be-localized device, in which the second packet S2 is sent at the time point $t_1$ at which the reference base station sends the first packet S1. Furthermore, since $t_{r1}$ is calculated based on the time point $t_2$ at which the first base station receives the first packet S1 and the time point $t_3$ at which the first base station sends the second packet S2, $t_{r1}$ should be divided by the first clock correcting coefficient $r_1$ so as to change to the clock time of the reference base station, and then divided by $r_3$ so as to change to the clock time of the to-be-localized device.

$TOF_1$ in equation (1) is derived based on the clock time of the reference base station using equation (2) below:

$$TOF_1 = \frac{T_{round1} \times T_{round2} - T_{reply1} \times T_{reply2}}{2(T_{reply1} + T_{round2})}$$

Taking the embodiment of FIG. 22 for example, in equation (2), $T_{round1}=t_7-t_6$ applies, indicating the time difference $T_{round1}$ between the time point $t_7$ at which the reference base station receives the acknowledgement packet $S_{ack1}$ and the time point $t_6$ where the reference base station sends the test packet $S_{test}$. Furthermore, in equation (2), $T_{round2}$ equals $t_2-t_{10}$, indicating the time difference $T_{reply1}$ between the time point $t_{10}$ where first base station sending the acknowledgement packet $S_{ack1}$ and the time point $t_2$ where the first base station receiving the first packet S1; $T_{reply2}$ equals $t_1-t_7$, indicating the time difference $T_{replay2}$ between the time point $t_1$ where the reference base station sends the first packet S1 and the time point $t_7$ where the reference base station receives the acknowledgement packet $S_{ack1}$. Since $TOF_1$ is derived based on the clock time of the reference base station, $TOF_1$ is multiplied by $r_3$ in equation (1) so as to change to the clock time of the to-be-localized device. However, the present invention is not limited to way of deriving $TOF_1$. In other embodiments, $TOF_1$ can be derived with other calculation processes and corrected by a clock correcting coefficient to change to the clock time of the to-be-localized device. By means of equation (1), the present embodiment achieves the synchronization among the first base station, the reference base station, and the to-be-localized device.

Next, step S108 is performed, in which the third-time-point calibrating value is derived according to equation (3) below:

$$t_{a2} = t_{at2} - t_{r2} \times \frac{r_3}{r_2} - TOF_2 \times r_3$$

In equation (3), $t_{a2}$ is the third-time-point calibrating value, $r_2$ is the second clock correcting coefficient, and $TOF_2$ is the second transmission time information. The third-time-point calibrating value $t_{a2}$ derived in equation (3) can be seen as the time point at which a third packet S3 sent by the second base station arrives at the to-be-localized device, in which the third packet S3 is sent at the time point where the reference base station sends the first packet S1. It should also be noted that the present invention is not limited to the way $TOF_2$ is derived. In other embodiments, $TOF_2$ can be derived in other calculation processes and then corrected to the clock time of the to-be-localized device through a clock correcting calculation.

The to-be-localized device derives the first time point $t_r$, the second-time-point calibrating value $t_{a1}$, and the third-time-point calibrating value $t_{a2}$ through step S100 to step S102, which respectively represent the time points where the first packet S1 sent by the reference base station, the second packet S2 sent by the first base station, and the third packet S3 sent by the second base station arrive at the to-be-localized device, in which the first packet S1, the second packet S2, and the third packet S3 are sent at the same time. With the first time point $t_r$, the second-time-point calibrating value $t_{a1}$, and the third-time-point calibrating value $t_{a2}$, the position of the to-be-localized device can be derived through a time difference of arrival (TDOA) calculation (step S110).

The difference between the wireless localization method in the prior art and the wireless localization method of the present embodiment is described below. In the prior art, the ranging method based on SDS-TWR includes three times of signal exchange between the to-be-localized device and the base station. The time of flight between the to-be-localized device and the base station can be derived from the receival time points and sending time points of the three signal exchange operations. Since the to-be-localized device sending signals is indispensable part in the prior art localization method, the more to-be-localized devices there are in the localization system, the more time it takes to complete the localization process. The present embodiment provides improved wireless localization method which makes changes to the SDS-TWR ranging method of prior art, wherein the reference base station performs packet exchange according to SDS-TWR method with the localization base stations, e.g. the first base station and the second base station of the present embodiment, and the to-be-localized device performs only the receiving of signals and TDOA calculation. In this way, when applied to a localization system with multiple to-be-localized devices, the time that the wireless localization method of the present embodiment spends to complete the localization equals the time spent to localize one to-be-localized device, which is advantageous compared to a localization system with multiple to-be-localized devices using the prior art localization method.

Moreover, in another embodiment, the wireless localization method provided by the present embodiment utilizes the to-be-localized device, the first base station, and the second base station that include the antenna structure U of the first embodiment to the third embodiment, thereby achieving accurate localization with the help of enhanced circular polarization of the antenna structure U.

In summary, the wireless localization method provided by the fourth embodiment achieves the technical feature of "the to-be-localized device deriving the localization information of the to-be-localized device according to a second-time-point calibrating value, a third-time-point calibrating value and a first time point through a time-difference-of-arrival calculation" through the technical solutions of "the to-be-localized device receiving the first packet sent from the reference base station at the first time point", "the to-be-localized device receiving the second packet from the first base station at the second time point, the second packet including a first response time information, a first clock correcting coefficient of the first base station with respect to the reference base station, and a first transmission time information, in which the first response time information corresponding to the time needed for the first base station to process information sent from the reference base station, and the first transmission time information corresponding to the transmission time between first base station and the reference base station", and "the to-be-localized device receiving the third packet from the second base station at the third time point, the third packet including a second response time information, a second clock correcting coefficient of the second base station with respect to the reference base station, and a second transmission time information, in which the second response time information corresponding to the time needed for the second base station to process information sent from the reference base station, and the second transmission time information corresponding to the transmission time between second base station and the reference base station."

The present invention has been described with reference to the above embodiments, but the above embodiments are merely examples for implementing the present invention. It should be noted that the disclosed embodiments are not intended to limit the scope of the present invention. On the contrary, any modification and equivalent configuration within the spirit and scope of the appended claims shall fall within the scope of the present invention.

What is claimed is:

1. A wireless localization method, comprising:
    a to-be-localized device receiving a first packet from a reference base station at a first time point;
    the to-be-localized device receiving a second packet from a first base station at a second time point, wherein the second packet comprises a first response time information, a first clock correcting coefficient of the first base station with respect to the reference base station, and a first transmission time information, in which the first response time information corresponding to the time needed for the first base station to process information sent from the reference base station, and the first transmission time information corresponding to the transmission time between first base station and the reference base station;
    the to-be-localized device receiving a third packet from a second base station at a third time point, wherein the third packet comprises a second response time information, a second clock correcting coefficient of the second base station with respect to the reference base station, and a second transmission time information, in which the second response time information corresponding to the time needed for the second base station to process information sent from the reference base station, and the second transmission time information corresponding to the transmission time between second base station and the reference base station;
    the to-be-localized device deriving a second-time-point calibrating value according to the second time point, the first response time information, the first clock correcting coefficient, the first transmission time information and a third clock correcting coefficient of the to-be-localized device with respect to the reference base station;
    the to-be-localized device deriving a third-time-point calibrating value according to the third time point, the second response time information, the second clock correcting coefficient, the second transmission time information and the third clock correcting coefficient; and
    deriving a localization information of the to-be-localized device according to the second-time-point calibrating value, the third-time-point calibrating value and the first time point through a time-difference-of-arrival localization process.

2. The method according to claim 1, wherein before the step of the to-be-localized device receiving the second packet from the first base station at the second time point, the method further comprises:

the first base station deriving the first response time information, the first clock correcting coefficient, and the first transmission time information by performing a packet exchange mechanism with the reference base station.

3. The method according to claim 2, wherein the packet exchange mechanism comprises a symmetrical double-sided two-way ranging method.

4. The method according to claim 1, wherein the step of the to-be-localized device deriving the second-time-point calibrating value according to the second time point, the first response time information, the first clock correcting coefficient, the first transmission time information and the third clock correcting coefficient further comprises:

the to-be-localized device deriving the second-time-point calibrating value according to the following equation:

$$t_{a1} = t_{at1} - t_{r1} \times \frac{r_3}{r_1} - TOF_1 \times r_3$$

wherein $t_{a1}$ is the second-time-point calibrating value, $t_{at1}$ is the second time point, $t_{reply}$ is the first response time information, $r_1$ is the first clock correcting coefficient, $r_3$ is the third clock correcting coefficient, and $t_{r1}$ is the first transmission time information.

5. The method according to claim 1, wherein the first response time information is the time difference between the reception of the first packet and sending of the second packet by the first base station, and the second response time information is the time difference between the reception of the first packet and the sending of the third packet by the second base station.

6. A wireless localization method applicable to a wireless localization system, the wireless localization system comprising a to-be-localized device, a reference base station, a first base station and a second base station, wherein the to-be-localized device, the reference base station, the first base station and the second base station have an antenna structure according to claim 1, the method comprising:

the to-be-localized device receiving a first packet from the reference base station at a first time point;

the to-be-localized device receiving a second packet from the first base station at a second time point, wherein the second packet comprises a first response time information, a first clock correcting coefficient of the first base station with respect to the reference base station, and a first transmission time information, in which the first response time information corresponding to the time needed for the first base station to process information sent from the reference base station, and the first transmission time information corresponding to the transmission time between first base station and the reference base station;

the to-be-localized device receiving a third packet from the second base station at a third time point, wherein the third packet comprises a second response time information, a second clock correcting coefficient of the second base station with respect to the reference base station, and a second transmission time information, in which the second response time information corresponding to the time needed for the second base station to process information sent from the reference base station, and the second transmission time information corresponding to the transmission time between second base station and the reference base station;

the to-be-localized device deriving a second-time-point calibrating value according to the second time point, the first response time information, the first clock correcting coefficient, the first transmission time information and a third clock correcting coefficient of the to-be-localized device with respect to the reference base station;

the to-be-localized device deriving a third-time-point calibrating value according to the third time point, the second response time information, the second clock correcting coefficient, the second transmission time information and the third clock correcting coefficient; and deriving a localization information of the to-be-localized device according to the second-time-point calibrating value, the third time-calibrating value and the first time point through a time-difference-of-arrival localization process.

* * * * *